J. JONES.
WAREHOUSE TRUCK BRAKE ATTACHMENT.
APPLICATION FILED FEB. 21, 1910.
974,572.
Patented Nov. 1, 1910.
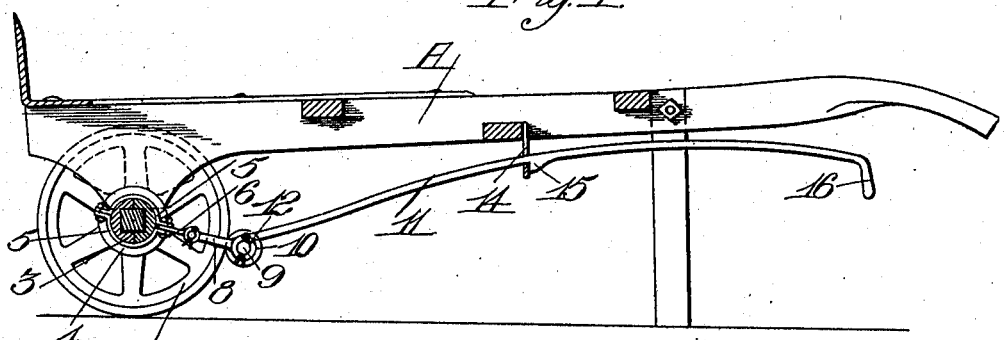
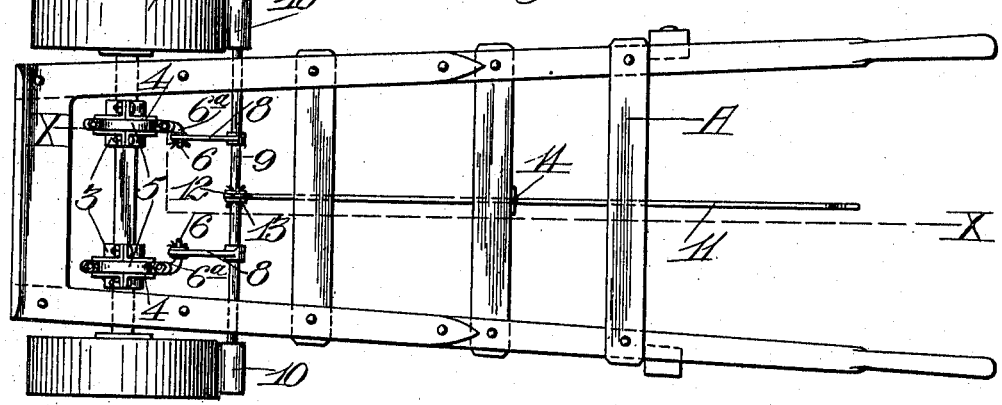
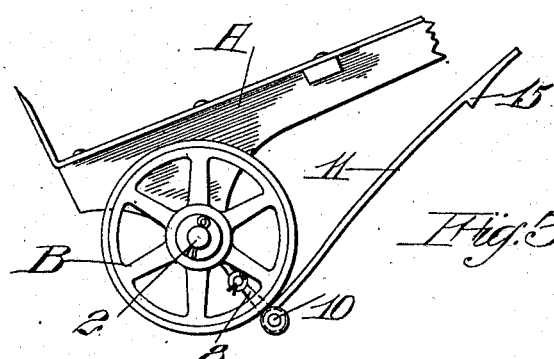

UNITED STATES PATENT OFFICE.

JOHN JONES, OF SALEM, OREGON, ASSIGNOR OF ONE-HALF TO TIMOTHY SEXTON, OF SAN FRANCISCO, CALIFORNIA.

WAREHOUSE-TRUCK-BRAKE ATTACHMENT.

974,572.  Specification of Letters Patent.  Patented Nov. 1, 1910.

Application filed February 21, 1910. Serial No. 545,078.

*To all whom it may concern:*

Be it known that I, JOHN JONES, a citizen of the United States, residing at Salem, in the county of Marion and State of Oregon, have invented new and useful Improvements in Warehouse-Truck-Brake Attachments, of which the following is a specification.

My invention relates to an attachment for warehouse trucks, which is designed to lock the wheels, and to prevent the truck from receding while being loaded.

It consists in the combination of parts, and in details of construction which will be more fully explained by reference to the accompanying drawings, in which—

Figure 1 is a section on line $x$—$x$ Fig. 2. Fig. 2 is a plan view. Fig. 3 is a broken away view showing the truck in a locked position.

It is the object of my invention to provide a cheap, effective, and easily manipulated locking device for warehouse trucks.

As shown in the drawing, A is the frame or body of the truck having the usual handles, the wheels B mounted and turnable upon the axle 2 which is here shown with the central portion rectangular in form, and bolted securely to the lower front portion of the truck frame. Upon this axle are removably fitted clamps 3 which have flanges, allowing the segments of the clamps to be bolted upon each side of the axle, and thus firmly secure them thereto. These clamps have flanges 4 separated from each other so as to provide annular grooves or channels, the clamps being so matched that these grooves are practically smooth and continuous. Within these grooves are loosely fitted the bands or straps 5, which are also made in segments, and having flanges through which they are bolted, or otherwise secured together, thus making continuous bands which fit and are turnable in the grooves of the clamps. Between the contiguous flanges, at one side, are fitted arms 6 which are bolted and firmly secured to the flanges by the bolts which hold the flanges together. These arms are bent at right angles, as shown at 6ª, and have loosely pivoted upon them the upper or inner ends of links 8. The opposite ends of these links have secured to them a rod or bar 9 of such length as to extend practically the full distance between the truck wheels, and this rod carries upon its outer ends the chock blocks 10, which blocks are adapted to engage the wheels of the truck, and at the same time rest upon a floor or surface, thus forming a lock to prevent the wheels from turning. This lock is readily effected by reason of the toggle joint formed by reason of the connection of the links 8 with the arms 6 of the loosely turnable bands 5, previously described. By this construction it will be seen that this toggle joint allows the chock blocks to readily adjust themselves to the position of the wheel trucks upon the floor when the truck frame is tilted about said wheel axles, to enable it to be loaded, and when thus loaded the chocks will prevent the wheels from running backwardly when the handles of the truck are brought down into proper position for trundling it over the floor.

When it is desired to disengage the chocks and to allow the wheels to run freely, it is effected by means of an arm 11, the front end of which is connected or formed with a loosely turnable ring or sleeve 12, which fits in a grooved collar 13 fixed to the center of the chock-carrying shaft 9. The rear end of this arm 11 is slidable in a supporting yoke 14 fixed to one of the cross-bars of the truck frame.

The arm 11 has a tooth or latch 15 upon its lower edge, and a handle 16 located conveniently to the operator, so that by pulling this handle back, the toggle-joint will be extended, the sleeves or bands 5 turning freely about the clamps 3, and in conjunction with the links 8 allowing the connections to be so extended that the chock blocks are moved sufficiently away from the periphery of the truck wheels to allow the latter to turn freely. When the arm 11 is disengaged from the holding catch, and the chock blocks allowed to drop upon the floor, the toggle joint will fold or bend sufficiently to allow the chocks to engage the wheels and the floor as previously described.

Having thus described my invention, what I claim and desire to secure by Letters Patent is—

1. The combination with a wheeled truck, of a bar having chock or locking blocks at its ends adapted to be wedged between the truck wheels and the floor, links projecting from the bar and bands loosely turnable about the wheel axle, said bands having projecting arms forming with the links a toggle-joint between the bands and the bar, and means connected to the bar for raising and lowering the same and the blocks relatively to the floor.

2. The combination with a wheel truck and the axle thereof, of clamps secured to the axle, having grooves or channels in the periphery, bands fitting and turnable in said grooves, arms carried by the bands, links having the upper ends turnably connected with the arms, a bar with which the opposite ends of the links are connected, said bar having chocks or locking blocks at its ends capable of being wedged between the periphery of the wheels and the floor.

3. The combination with a wheel truck and the axle thereof, of clamps secured to the axle, having grooves or channels in the periphery, bands fitting and turnable in said grooves, arms carried by the bands, links having the upper ends turnably connected with the arms, a bar with which the opposite ends of the links are connected, said bar having chocks or locking blocks at its ends capable of being wedged between the periphery of the wheels and the floor, and a means for withdrawing the chocks from the wheels.

4. The combination with a wheel truck and the axle thereof, of clamps secured to the axle, having grooves or channels in the periphery, bands fitting and turnable in said grooves, arms carried by the bands, links having the upper ends turnably connected with the arms, a bar with which the opposite ends of the links are connected, said bar having chocks or locking blocks at its ends capable of being wedged between the periphery of the wheels and the floor, a means for withdrawing the chocks from the wheels, said means consisting of a slidable bar connected with the center of the chock-carrying bar and having a latch upon it, and a yoke with which said latch is adapted to engage.

5. The combination with a wheeled truck, of a bar substantially parallel with the wheel axle, chocks fixed to the bar and adapted to engage and lock the wheels, a toggle-joint connection between the bar and the wheel axle, one member of the joint being connected to the bar and the other member being tween the bar and axle.
loosely turnable about the axle, and means to bend the joint and thus vary the distance be- In testimony whereof I have hereunto set my hand in the presence of two subscribing witnesses.

JOHN JONES.

Witnesses:
SAM JOHNSON,
R. J. CORBLE.